Jan. 1, 1935.  J. A. DAY  1,985,888
COMBINED DRAFT AND POWER TAKEOFF FRAME FOR ROCK CRUSHERS AND THE LIKE
Filed Jan. 30, 1930

Inventor
James A. Day
By Milo B. Stevens Co.
Attorneys

Patented Jan. 1, 1935

1,985,888

UNITED STATES PATENT OFFICE 1,985,888

COMBINED DRAFT AND POWER TAKEOFF FRAME FOR ROCK CRUSHERS AND THE LIKE

James A. Day, Knoxville, Tenn., assignor to Day Pulverizer Company, Knoxville, Tenn., a corporation of Tennessee Application January 30, 1930, Serial No. 424,674

1 Claim. (Cl. 180—14)

My invention relates to combined draft and power takeoff frames for rock crushers and the like, and has for its primary object to provide a construction as specified wherein the rock crusher may remain connected to the tractor or other motivating piece of machinery to be drawn about while the rock crusher is in operation and driven by a driven element of the tractor.

The invention further contemplates a draft and power takeoff supply frame for rock crushers and the like having means establishing a flexible driving connection between the rock crusher and a power takeoff element of the tractor or other draft means and incorporating a draft connection,—the nature of said draft connection, power takeoff connection and the frame being such as to permit the tractor to turn in short circles while pulling the same and during the operation of the crusher or other machine carried by the frame.

The invention also resides in certain novel features of construction, combination and arrangement of the various parts and in certain modes of operation, all of which will be readily understood and appreciated by those skilled in the art upon reference to the accompanying drawing in connection with the detailed description appearing hereinafter.

While the drawing illustrates what now appears to be a preferred form of the invention,—yet it will be understood that the same is capable of other mechanical expressions within the spirit and scope of the subject matter claimed hereinafter.

Figure 1:
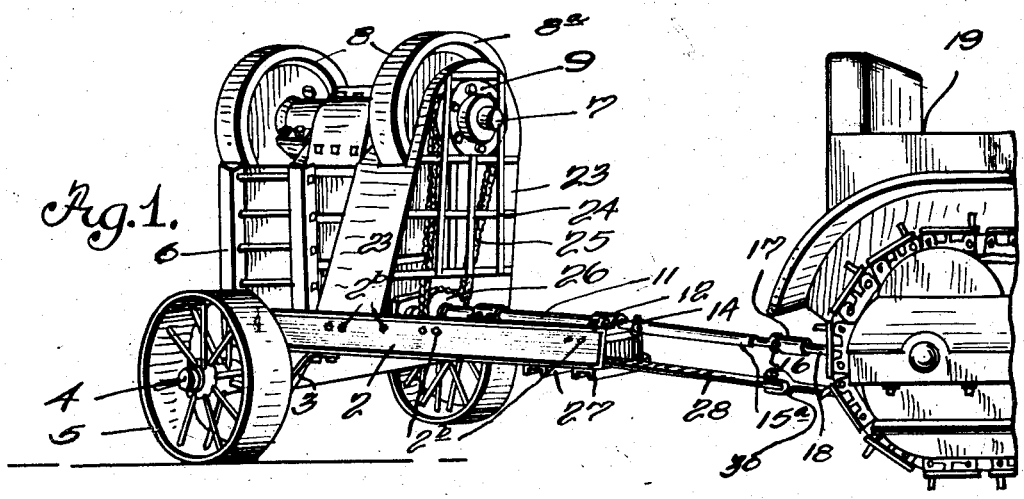
Figure 1 is a perspective view illustrating the application of my invention to a rock crusher and tractor.

Referring specifically to the drawing, wherein the same reference characters have been used to designate the same parts in all views,—the crusher frame 1 comprises side members 2 converging at their forward ends and connected by cross members $2^a$, as indicated. The side members 2 carry the bearings 3 for the shaft 4 supporting the wheels 5.

The crusher 6 has a driven shaft 7 carrying the fly wheels 8 having the lateral peripheral flanges $8^a$, one of which overlies the plane of the sprocket gear 9, which is secured on the shaft 7 adjacent one of the fly wheels $8^a$, as clearly shown in Figure 1. This sprocket wheel is an element of the drive means for the crusher as will be apparent from the disclosure and will be more fully explained hereinafter.

Figure 2:
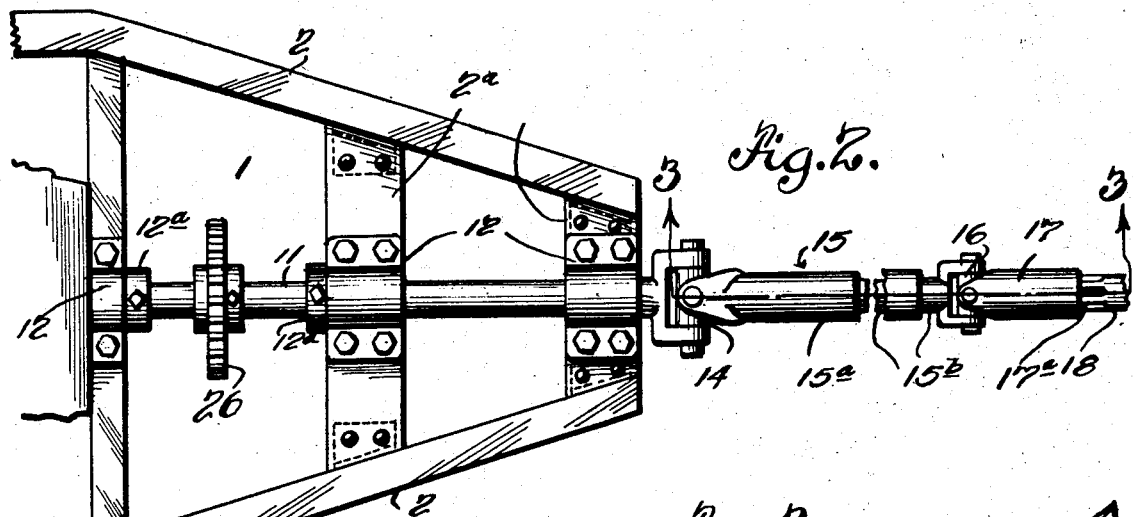
Figure 2 is a top plan view partly broken and showing the forward portion of the rock crusher frame.
Figure 3:
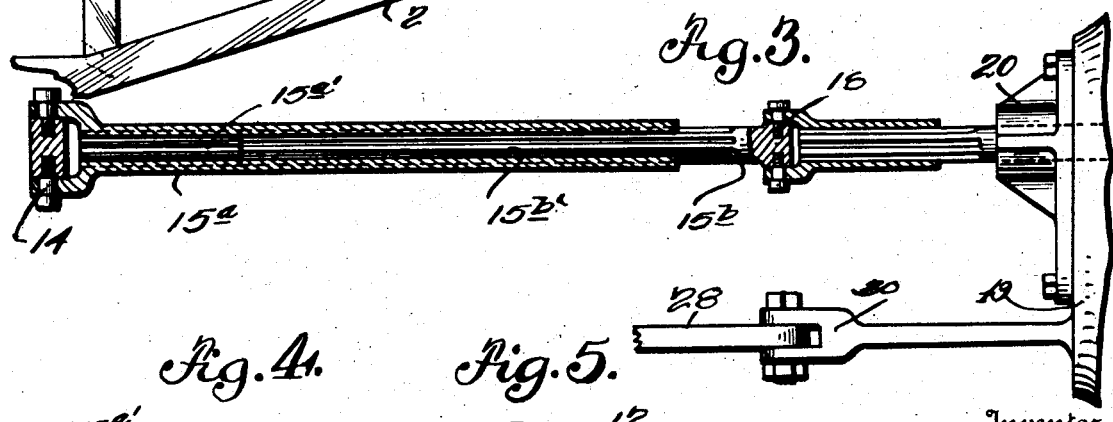
Figure 3 is a longitudinal sectional view taken on the line 3—3 of Figure 2.
Figures 4, 5:
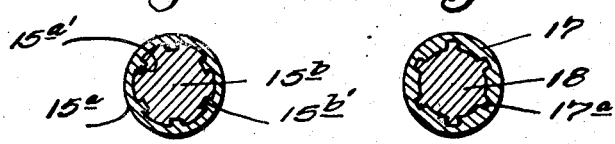
Figure 4 is a cross sectional view through the telescoping drive shaft portions $15^a$, $15^b$, and,—
Figure 5 is a cross sectional view through the sleeve 17 and tractor drive shaft 18.

Figures 1 and 2 illustrate that the cross members $2^a$ carry the bearings 12 for the shaft sections 11, whose forward end extends beyond the end of the forward cross member $2^a$ and the end of the frame 1 to have a universal joint connection 14 with the sleeve member $15^a$ of an extensible shaft 15 whose outer end has a universal joint connection 16 with the sleeve 17 having the splined telescopic connection with the driven stub shaft 18 of the tractor 19. The tractor 19 has the bearing 20 for the driven stub shaft 18, as shown in Figure 3, which Figure also shows that the telescoping members $15^a$, $15^b$ have a splined connection $15^{a\prime}$, $15^{b\prime}$, so that in effect an extensible power shaft element 15 is provided enabling the length to be adjusted at will according to the distance it is desired to dispose the frame 1 behind the tractor 19.

Figure 1 shows that the frame 1 has rising from the side members 2 a protecting frame 23, whose forward edge extends beyond the peripheries of the adjacent fly wheel $8^a$ to support a lattice work protection frame 24, which is adapted to overlie the sprocket gear and likewise the chain 25 which establishes a driving connection between the sprocket gear 26 keyed upon shaft 11 and the sprocket gear of the crusher shaft 7. It will be manifest from what has been said that the crusher shaft 7 will be driven from the tractor through the flexible and extensible shaft section hereinabove described.

Still referring to Figure 1 it will be seen that the bottom edges of the side members 2 of the crusher frame 1 carry the U-shaped cross members 27 which support the draft bar 28 which is adapted to be connected to the tractor coupling piece in the usual way.

Naturally in view of the double universal joint construction 14, 16, coupled with the extensible power shaft $15^a$, $15^b$, the tractor can be turned in very short circles without disconnecting the crusher and while the crusher is still in operation driven from the power shaft 18 of the tractor. Of course, the draft bar or member 28 has a pivotal connection with the tractor, as shown.

As a practical proposition as the tractor turns this way and that while drawing the crusher, the shaft $15^b$ will be periodically pulled in or pushed out slightly relative to its splinedly connected telescoping sleeve 15ª.

By this invention the work of rock crushing can be carried on very expeditiously in that the crusher can be pulled to various places where the rock is located and stopped while the crusher is loaded up. It is not necessary to aline the crusher with the tractor in order that the crusher may be driven and it is not necessary that the ground be level. In fact, as previously stated, the crusher can be driven while the tractor is being moved across the field. In effect the crusher can be used for liming the land as it operates while the tractor is in motion and drawing the crusher along.

Figure 2 illustrates a stop collar 12ª upon the shaft 11 and adjacent the innermost bearing 12 so as to limit inward movement of shaft 11. Another stop collar is located at the opposite side of sprocket 26 and adjacent the intermediate bearing 12 to prevent movement of the shaft in the other direction. Both of these stop collars are designated as at 12ª in the drawing.

Figure 3 shows the draft bar 28 as having a pivotal connection with the draft connection 30 of the tractor located immediately below the universal joint 16.

Having thus described my invention, what I claim as new and desire to secure by Letters Patent is:

In a rock crusher having a wheeled supporting frame including side members converging at their forward ends, spaced across members connecting said side members, a bearing mounted on the upper surfaces of each of said cross members intermediate the ends thereof, a draft connection mounted on the frame adapted to be hingedly connected to a tractor or the like, a power take-off shaft supported by the bearings of the cross members in a plane parallel to the frame, said shaft provided at one end and intermediate adjacent bearings with a sprocket wheel and at the other end with a universal coupling, a driving connection for said sprocket wheel and the crusher, a second shaft extending forwardly of said first mentioned shaft, said second shaft consisting of a pair of extensible telescopic members, the members being splined and slidably engageable with each other, one member flexibly coupled to the first mentioned shaft, the second member provided with a universal connection, a splined sleeve coupled to said connection and adapted for attachment to a splined tractor driving shaft, the driving connection for the crusher comprising a driven shaft, means for mounting said last mentioned shaft vertically above and parallel to the frame, a flywheel and a sprocket secured to the driven shaft, and a chain connecting the sprocket and sprocket wheel.

JAMES A. DAY.